Sept. 3, 1946. P. HILDEBRAND ET AL 2,407,154
SETTING DEVICE ON MECHANICAL AND ELECTRICAL MEASURING INSTRUMENTS
Filed Jan. 9, 1941
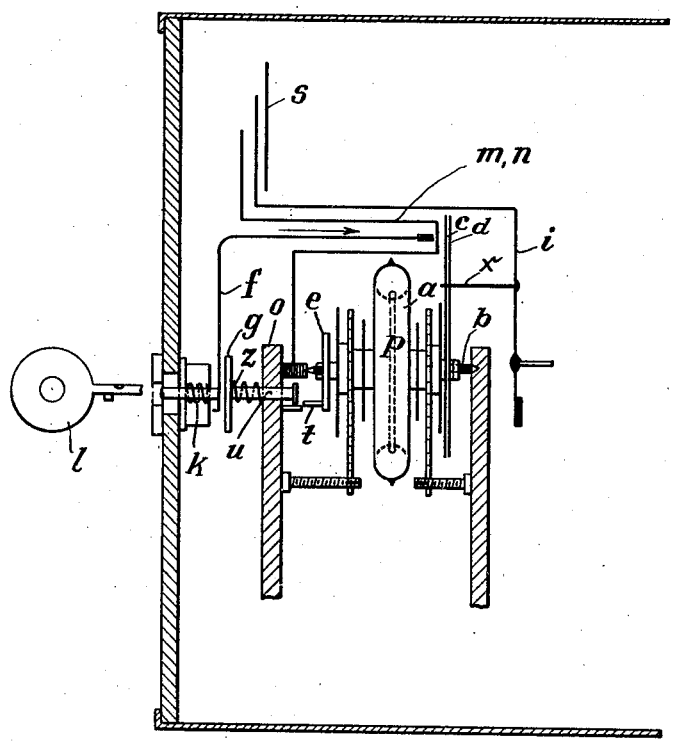
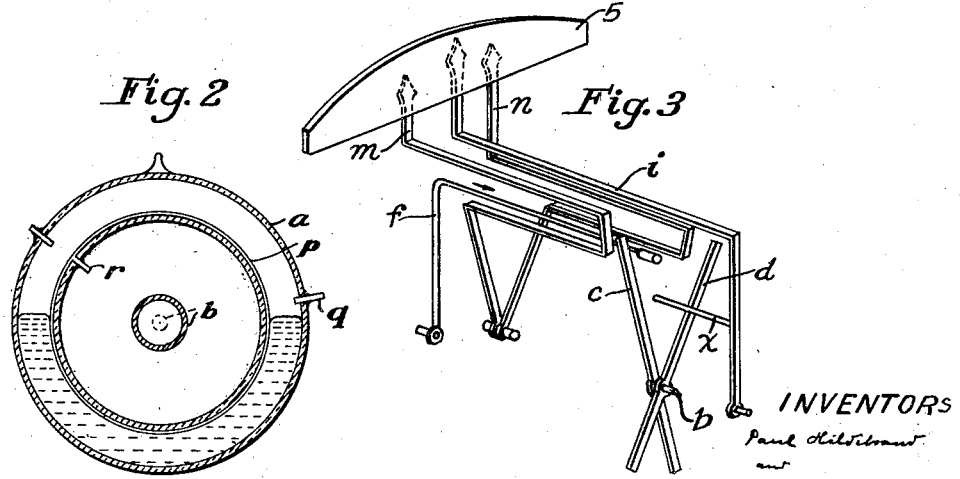
INVENTORS
Paul Hildebrand
and
Arthur Metz
by
their ATTORNEY Patented Sept. 3, 1946

2,407,154

UNITED STATES PATENT OFFICE 2,407,154

SETTING DEVICE ON MECHANICAL AND ELECTRIC MEASURING INSTRUMENTS

Paul Hildebrand and Artur Metz, Mannheim, Germany; vested in the Alien Property Custodian Application January 9, 1941, Serial No. 373,780
In Germany September 2, 1940

3 Claims. (Cl. 200—56)

In mechanical and electric measuring instruments in which, when a certain maximum or minimum value is attained, it is customary to effect certain indicating or controlling operations by means of a switch such as a mercury tube switch operated by the pointer or band of the measuring instrument. Constructions are known in which a ring shaped tube switch located in front of the indicating hand of the instrument is operated by the indicating hand through means of a projection on the switch which is engaged by the hand. For adjusting the contact of the mercury ring-shaped tube for contact giving when a certain maximum or minimum value of the instrument has been attained, the casing of the instrument must be opened. It is then either necessary to hold the extended hand shaft in order to adjust the mercury tube, or the ring-shaped mercury tube itself must be adjusted in order that the position at which the pointer moves the switch can be adjusted. The circumstance that the protecting case must be opened for the setting is impeding and inconvenient. Further, in arrangements of this type, an accurate adjusting to the desired scale value is extremely difficult and time wasting and cannot be carried out by every one, as it is necessary to open the instrument. According to the invention the setting takes place from the outer side and can be carried out by any one without opening the case.

The invention relates to a setting device on mechanical and electric measuring instruments, in which by means of mercury switch tubes connected with the hand of the measuring instrument an electrical circuit may be established when a certain maximum or minimum value of the measuring value is attained. In accordance with the present invention, means is provided for adjustment of the maximum and minimum values from the outside of the instrument case. According to the invention this is effected through the employment of one or two catch-hands which are frictionally held on the shaft carrying the mercury switch tube so that, when the shaft is held fast, the hands can be adjusted independently the one from the other from the outer side by means of a separate device or by an element accessible from the outer side.

Other features of the invention relate to the provision of additional hands or pointers indicating the set value and to a facilitated possibility of providing the seals for the current leads on the mercury switch tube to improve the construction of the mercury tube switch, whereby the switch may be caused to close any of several circuits.

According to the invention two other hands are arranged, axially parallel to the catch-hands but separate from the same, these hands serving for indicating the maximum and minimum values. These hands indicating the set value are within the range of action of a setting lever, and they are shiftable by means of this lever parallel to the catch-hands to any desired point of the scale. Their position can, however, not be altered by the catch pin contrary to the two catch-hands. The additional hands are bent at right angles so that showing on the scale moves in front of and over the catch-hands so that the adjusted initial values can always be ascertained and read. These hands indicating the set value are preferably fixed on the front fixation plate on the existing bracket, or on a bracket especially provided herefor, that is separate from the shaft, and so that they are movable with respect thereto.

Another feature of the invention relates to the enlargement of the contact range of the mercury switch tube. This mercury switch tube, as is generally known, serves for establishing a connection between the contact for the current supply and the contact for the current discharge as long as the mercury is in contact with the two seals. As usually the mercury filling amounts to about 180° or fills half the ring-shaped tube, a connection can take place only in this angular position, i. e. when the mercury bridges two contacts, which means that a connection is always ensured according to the height of the mercury filling related to the degree of angle. In order that the seals may be arranged as desired and in order to further ensure a reliable current connection for the angular oscillations happening in practice, a metal ring connected with a seal is provided according to the invention on the inner circular or ring-shaped wall part of the mercury ring tube corresponding to the angular oscillation. This arrangement presents at the same time the advantage, that the mechanical resistance otherwise occurring at the seals is overcome and thereby the turning moment of the tube becomes considerably more favorable.

The preferred embodiments of the invention are illustrated in the accompanying drawing, in which Fig. 1 is a vertical central sectional view, partly in elevation, through a portion of measuring instrument showing one embodiment of my invention, Fig. 2 is a side elevation partly in section of a mercury ring tube switch shown in Fig. 1.

Fig. 3 is a perspective view of certain features of construction shown in Fig. 1.

On a shaft $b$ one or more mercury ring tubes $a$ of suitable shape are fixed. On one end of the shaft two catch-arms $c$ and $d$ are frictionally mounted so that they can be adjusted independently the one from the other when the shaft $b$ is held fast. On the other end of shaft $b$ a holding device $e$ is mounted, which consists of a disc with abutment pin $t$, said disc being adapted to be securely held in its position by a bolt $u$ of a disc $g$ after this bolt has been pressed inwards. The shaft $b$ with the two catch-arms $c$ and $d$, the mercury ring tube $a$, and the disc $e$ and with the necessary current terminals is revolvably mounted. The instrument hand or pointer $i$ has a catch pin $x$ engaging between the two catch-hands $c$ and $d$ frictionally held on the shaft $b$. If the apparatus hand $i$ moves over one of the set values, the catch pin $x$ engages one of the catch hands $c$ or $d$, whereby the shaft $b$ and the mercury ring tube $a$ are turned and at the same time the contacts on the mercury ring tube $a$ are switched-in or cut out. To alter the switch limit as desired, it is possible to adjust the two catch hands $c$ and $d$. This is attained in that the operating plunger member $f$ is pressed inwards from the outer side in the direction of the arrow by means of a handle or key $l$, whereby the holding device is actuated, in that the bolt $u$ of disc $g$ is pressed against the stop pin of disc $e$ so that the shaft $b$, and the mercury ring tube $a$, can no longer turn. The catch hands $c$ and $d$ can then be adjusted relative to the scale as desired. As soon as the adjusting to the desired value has been carried out, the adjusting lever $f$ and the disc $g$ with its bolt $u$ are brought again into the initial position by the action of springs $k$ and $z$. The socket key or the like $l$ may be employed for operating the holding device. In order to turn the arms $c$ and $m$ or $d$ and $n$ in the opposite directions, that is, for example, back to their original positions, the key $l$ is inserted and turned without pressing it inward until the arm $f$ is carried beyond the arms to be moved back. The key $l$ is then pressed and turned backward.

Mounted on the bracket $o$ in the range of action of the adjusting lever $f$ is a pair of indicating hands $m$ and $n$ which are axially parallel to the catch hands but are not operated thereby until the plunger shaft operated by the key $l$ is depressed. The indicating hands $m$ and $n$ are normally out of contact with the catch hands $c$ and $d$ and are out of the path of movement of the pin $x$. When the key $l$ is depressed the member $f$ is advanced to a position between the hands $m$ and $n$ and between the catch hands $c$ and $d$.

The hands $m$ and $n$ are bent at right angles so that their indicating part moves in front of and over the catch hands $c$, $d$ and can act to securely hold the initial or set values. Evidently, the hands for indicating the set value may be fixed on the front fixation plate or on an existing or separate bracket without departing from the inventive idea. This fixation is effected by means of movable frictionally held elements so that each one of the two hands can be set or adjusted alone, that is independently the one on the other.

The mercury switch tube $a$ of ring-shape, shown in Fig. 2, has a metal ring $p$ on its inner ring-shaped wall part, said ring being connected with the outer seal $r$. By turning the mercury ring tube the seal $q$ is connected with the seal $r$ through the mercury and the metal ring so that contact is produced. The inserted metal ring $p$ ensures, even at great angular oscillation at the turning of the ring tube always a permanent connection with the mercury, so that even at great angular oscillation corresponding to the mercury filling always a perfect connection is ensured, and an interruption between the two seals cannot occur even at excessive turning angle of the ring tube.

The knowledge according to the invention to carry out the actuation of the holding and adjusting means from the outer side of the casing includes the possibility, that especially the engaging point may be situated also inside the front wall of glass.

We claim:

1. A measuring instrument having a movable pointer, a switch, means for operating said switch on movement of said pointer outside a predetermined range, comprising a pair of pivoted arms adapted to be engaged by the pointer and moved in opposite directions when the pointer passes opposite limits of said range, friction operating connections between said arms and switch, means for changing the position of said arms to adjust said limits and operable from outside said instrument and means for holding said switch during the adjusting movement of said arms.

2. The instrument claimed in claim 1 wherein a pivoted pointer is provided for indicating the position of each arm and said changing means includes a member reciprocatably and rotatably mounted in said instrument with means for inserting said member between said position indicating pointers and between said arms and for rotating said member to change the positions of said arms and corresponding pointers.

3. A measuring instrument having a movable pointer, a rotatable shaft, a switch having rotatable contacts mounted on said shaft, a pair of arms frictionally held on said shaft and adapted to be engaged by said pointer and moved thereby in opposite directions when said pointer passes opposite limits of a predetermined range pointers for indicating the respective positions of said arm, pivotally mounted in said instrument, a reciprocating holding member adapted to prevent rotation of said contacts, a member for changing the position of said arms and corresponding pointer, said member being mounted to be moved between said arms and between said corresponding pointers and a key insertable into said contacts against rotation and move said member to a position between said arms and between the corresponding pointers and rotatable to change the positions of said arms and corresponding pointers.

PAUL HILDEBRAND.
ARTHUR METZ.